June 22, 1971        R. GEFFROY        3,586,544

METHOD OF PRODUCING PISTON RINGS

Filed July 17, 1967        7 Sheets-Sheet 1

Inventor:
Robert Geffroy
By
Karr Witcocks
Attorney

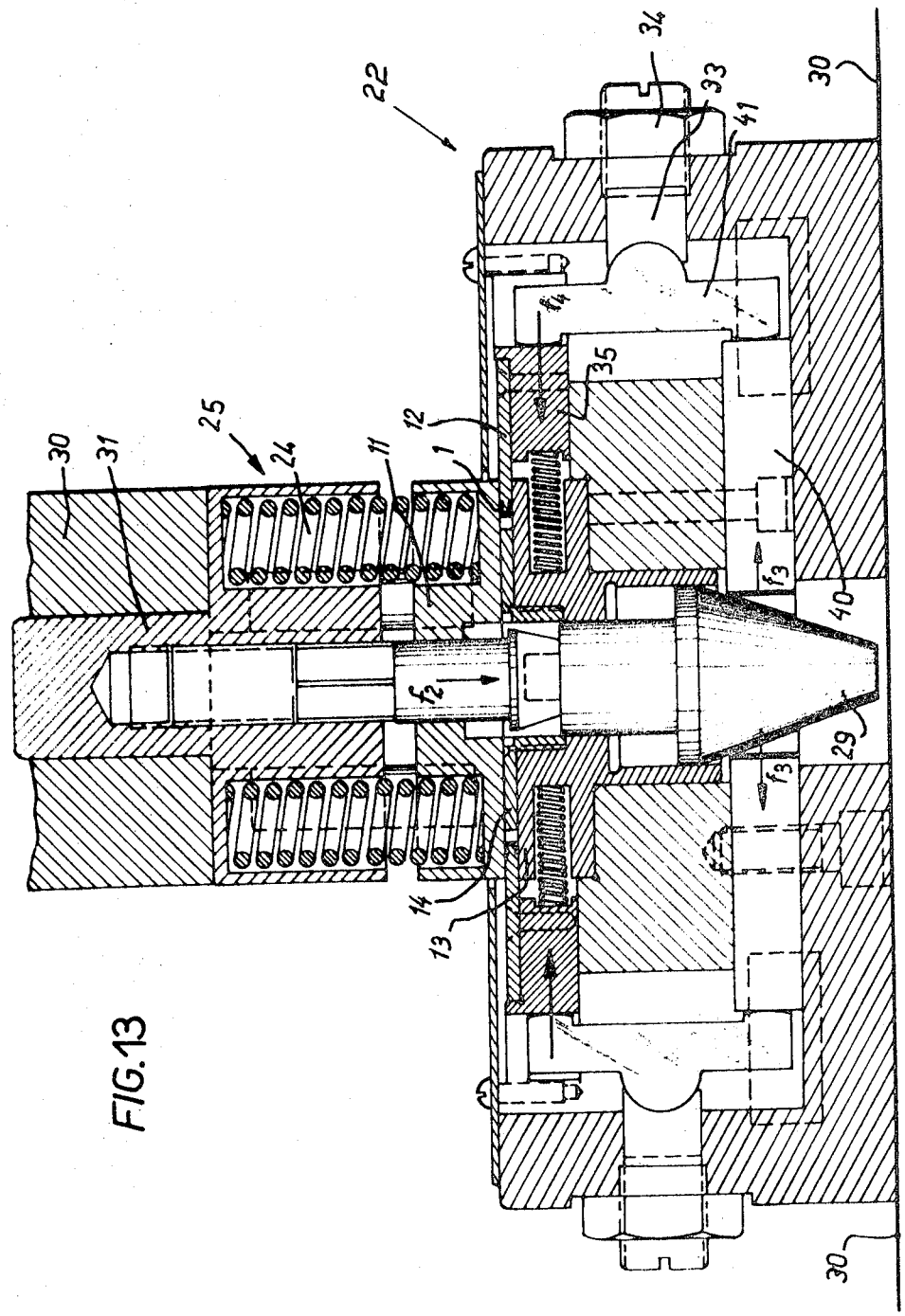

June 22, 1971 R. GEFFROY 3,586,544
METHOD OF PRODUCING PISTON RINGS
Filed July 17, 1967 7 Sheets-Sheet 7

United States Patent Office 3,586,544
Patented June 22, 1971

3,586,544
METHOD OF PRODUCING PISTON RINGS
Robert Geffroy, Neuilly-sur-Seine, France, assignor to Société de Mecanique de Pringy, Pringy Haute-Savoie, France
Filed July 17, 1967, Ser. No. 653,742
Claims priority, application France, July 20, 1966, 70,156, 70,157
Int. Cl. C21d 7/02, 9/40; B23p 15/06
U.S. Cl. 148—12                                                     9 Claims

ABSTRACT OF THE DISCLOSURE

An elastic piston ring, generally employed as a scraper ring and also known as an oil control ring, of spring steel of the U-section type, made from a strip of rolled steel comprising a grooved web and flanges cut-out in alternate folded portions so as to have a cross-section of U-shape, the said band being then cut into lengths which are rolled to the shape of a ring, the final lateral surfaces of the said piston ring each constituted by the successive sections of each flange being obtained by flow of the metal in an appropriate tool, by an operation known as forging, without other machining action on the said surfaces and a method for its manufacture.

---

The present invention relates to a forged elastic piston ring, and more particularly to a scraper ring also called oil control ring, consisting of a strip of spring steel, perforated, cut-out, folded to a U-section, bent, cold-hammered, treated, spread-out, and ground.

Elastic steel piston rings made up of a strip of machined elastic steel are already known.

Up to the present time, elastic steel piston rings have been composed in known manner of U-sections separated from each other by narrow spaces, arranged alternately in single staggered relation on the lips of the U.

The manufacturing process of these rings of the prior art is generally fed by a strip of cold-rolled commercial spring steel, which is delivered with a margin of rolling tolerances of the order of ±0.025 mm. Now the differences between the extreme tolerances imposed on the height of the finished ring is of the order of ±0.015 mm., whereas this height of the ring bent into a U from the inside, which comprises two strip thicknesses would, without grinding of the lateral walls, have differences in dimensions considerably greater than the imposed tolerances.

On the other hand, still considering the prior art, after having been perforated, cut-out, profiled and rolled, the ring is shaped in a press to a form similar to that which it will have in the cylinder and then, before heat teratment, it is enlarged on an expanding mandrel so as to give it a free diameter greater than that of the cylinder. Now, this expansion operation on an untreated metal gives rise to considerable deformation of the sections which make up the lateral faces. Thus, for these two reasons, bringing to size and shaping, the lateral wall must be ground.

Also in the prior art, the outer lips of the ring, constituted by the succession of outer edges of the sections, exhibit the accumulated irregularities due to the large tolerances on the width of the steel strip due to the fact that each section has a straight edge and to the deformation produced during the operations previously specified up to that of expansion. In this case, also, the ring must be brought to size and shape, which necessitates an external grinding operation.

These grinding operations, essential in the prior art, introduce into the manufacture difficult and costly handling (assembly and removal of the ring on and from a rigid ring, lateral grinding to about ±0.015 mm., assembly and removal of the ring on and from the external grinding mandrel, external grinding).

In addition, in consequence of the necessities imposed by the assembly of the piston ring on a holding ring, this lateral grinding operation subsequently involves necessities due to the mounting of the ring on a holding ring, in arranging a total number of clearances between the sections at least equal to about 1.5 mm., so as to permit compression on the ring, which is necessary in order to make it pass over the shoulder which holds it in the said ring.

Further, due to the elasticity of each section of the ring, which has a tendency to twist by the carrying away action of the grains of the grinding wheels, these grinding operations introduce, both on the ground side walls of the piston ring and also on the external lips, insiduous defects which are irregular due to the fact that they depend on imponderable variations in the bite of the grinding wheels, which are the causes of gas-tightness effects of the ring and a large proportion of scrap.

Finally, the lateral grinding operation on a ring requires a total clearance between the elastic sections of the ring so as to permit the placing of the ring in position inside the retaining ring after compression of the extra overlapping length. This clearance is greater than that which would be necessary and sufficient to avoid seizure of the piston ring in the engine and to ensure its satisfactory operation, and thereby involves a substantial defect of gas tightness which is inherent therewith.

Also, the actual operation of grinding with a grinding wheel, both on the side faces and on the external lips, applies to the sections a wrenching force in torsion which, due to the fact that the sections are not positively fixed and are only held in an elastic manner, results in irregularities of the lateral and external bearing surfaces of the piston ring. These surface defects also result in loss of gas-tightness which is added to those due to the large clearances between sections.

These gas-tightness defects have proved prohibitive in the case of engines working at low loads with a high mean depression, by permitting inacceptable quantities of oil to pass into the combustion chambers.

According to the invention, the new piston ring is essentially obtained by cold shaping on a powerful press which ensures the flow of the metal by means of a tool of appropriate quality, to give the ring, after simple machining (for example honing) of its outer lips in the compressed state, the exact shape and dimensions appropriate to its service in the cylinder, within the tolerances laid down by the specification and such that the range of certain variations in thickness is smaller than that of the thickness of the initial rolled strip. Before pressing, the blank comprises a slight excess of material, even when the raw material is at the minimum of these dimensional tolerances. This excess and those which may possibly arise from dimensions of raw material above these minima are, according to the invention, upset into expansion spaces formed in the tool.

The invention has also for its object to provide:

An elastic ring with sections separated by alternate clearances, in which the total clearance between the sections can be reduced to any value as small as necessary for the satisfactory operation of the engine, in practice to about 0.3 mm.;

A ring in which the bearing surfaces in the piston and the cylinder are fluid-tight against lubrication oil during the operation of the engine;

A U-shaped ring in which the coupling fillets of the lips of the U to the bottom of the U represent an upsetting of metal;

A U-shaped ring in which the internal wings of the U have metal expansion beads;

A U-shaped ring with cold-shaped faces, in which the manufacturing tolerances in height in the groove of the cylinder are less than the requirements of the specification, for example, 0.03 mm.;

A ring in which the contact between the sections at the level of the clearances is obtained by compression and is very close;

A ring with lips formed without other machining than a slight external operation, for example grinding, honing, lapping.

The process in accordance with the invention permits:

A forming tool for the manufacture of elastic piston rings by cold shaping using pressures of 100 to 200 tons in bridge presses;

The shaping on a shaping finger without other lateral machining of the rings bent to a U-shape, in which the difference between the extreme tolerances on the external height of the two arms of the U is less than the differences between the rolling tolerances;

Manufacture by cold shaping and simple external grinding-in, starting from rolled steel strips having the tolerances: on the thickness, about ±0.025 mm., that is to say a total of about ±0.050 mm. on the height containing the two arms of the U, of U-shaped scraper rings falling within the tolerances imposed: as a maximum for example, ±0.015 mm. on the height;

Manufacture of series of elastic scraper rings of forged spring steel, of which the percentage of finished products rejected for faults of shape or of dimensions outside the tolerances imposed is reduced to about 5%.

Manufacture of elastic rings with multiple sections, in which the total clearance of the spaces between the sections is brought to any desired value down to 0, for example between 0.8 to 0.1 mm.;

Manufacture of elastic piston rings with increased fluid-tightness which, subjected to test on an inspection test bench (for example an equipment as described in French patent application No. 69,978 of July 19, 1966 filed by the present applicant), show a flow rate of air leakage under a pressure of 0.3 kg./sq. cm., of 50 to 150 litres per hour instead of 300 to 600 litres per hour obtained with the piston rings of the prior art.

Other characteristic features and advantages will be brought out in the description which follows below with reference to the accompanying drawings, and giving by way of indication but not in any limitative sense, one form of embodiment of the invention.

In the drawings:

FIG. 13 is a view in cross-section of the press tool of FIG. 11 in the approach position of striking;

Figure 1:
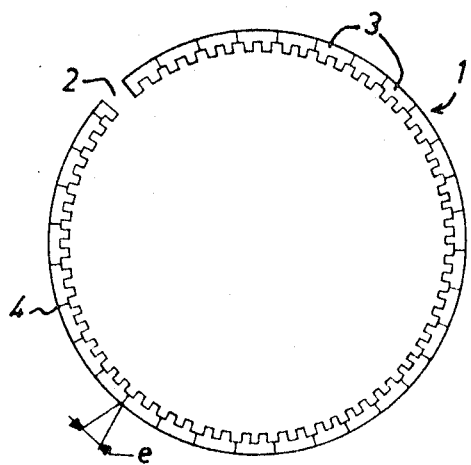
FIG. 1 is a plan view of a piston ring in accordance with the invention.

There is shown in FIG. 1 an elastic ring 1 open at 2. This ring, which has a section of U-shape, is composed of a number of elementary sections 3 separated from each other by clearances 4 of thickness "e," arranged alternately in simple staggered form on the two lips 5 and 6 of the ring.

Figure 2:
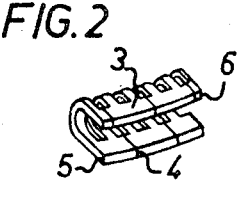
FIG. 2 is a perspective view of a fragment of the piston ring shown in FIG. 1.
Figure 3:
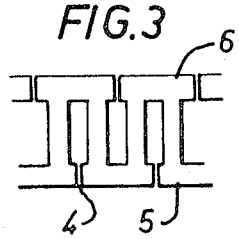
FIG. 3 is a view of the perforated strip before its folding to the U-shape of FIG. 2.

In the prior art, the manufacture of this ring was effected from a strip of spring steel perforated and cut-out, as shown in FIG. 3 folded to a U-shape as in FIG. 2, bent as shown in FIG. 1 and cold-pressed for shaping, according to FIG. 2. The rings were then spread out, heat treated and then ground on their lateral faces and on their external lips.

The lateral grinding operations were necessary on the one hand to absorb the differences of dimensions in the height of the ring arising from the tolerances of the rough rolled product of the order of ±0.025 mm. x 2, whereas the final tolerance required by the classification is of the order ±0.015 mm., and on the other hand, to remove the deformation which was introduced in the lateral faces after the cold-shaping and the spreading-out operation.

The grinding of the external lips was also necessary on the one hand to bring to a circular shape the alignment of the edges of sections, each of which is straight, and on the other hand to bring to the desired dimension the external diameter of the scraper ring.

Figure 4:
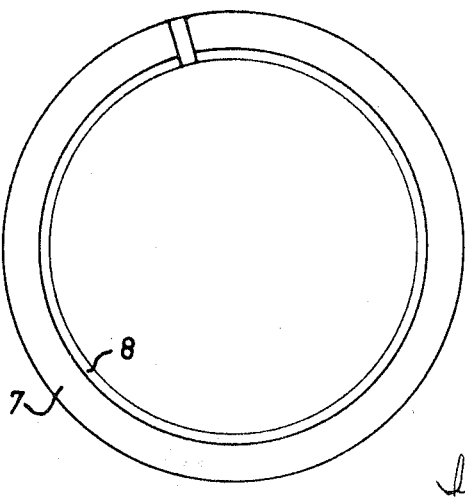
FIG. 4 is a supporting ring for the lateral grinding of piston rings of the prior art.

Still in the practice of the prior art, the rings were ground individually by mounting them inside a holding ring 7 (FIG. 4) astride a step 8. However, in order to be able to introduce the scraper ring into the interior of the ring 7 by passing the U over the step 8, whereas at this stage of manufacture, the length of the scraper ring in extension has an overlap of its extremities, or an excess length, of 7 to 9 mm., for example, for a ring of 75 mm. in diameter, it is necessary to apply to the extremities of the piston ring a considerable compression under conditions which do not respect its geometry and are liable to modify it.

A positioning operation of this kind further necessitates that the total clearance of the sum of the thickness "e" of the slots between the sections is at least for example 1.5 to 2.3 mm. with respect to the circumference of the ring in operation in the cylinder, which then adversely affects the satisfactory working gas-tightness of the piston ring in the cylinder, for which a clearance of 0.3 to 0.5 mm. is generally desired.

Figure 5:
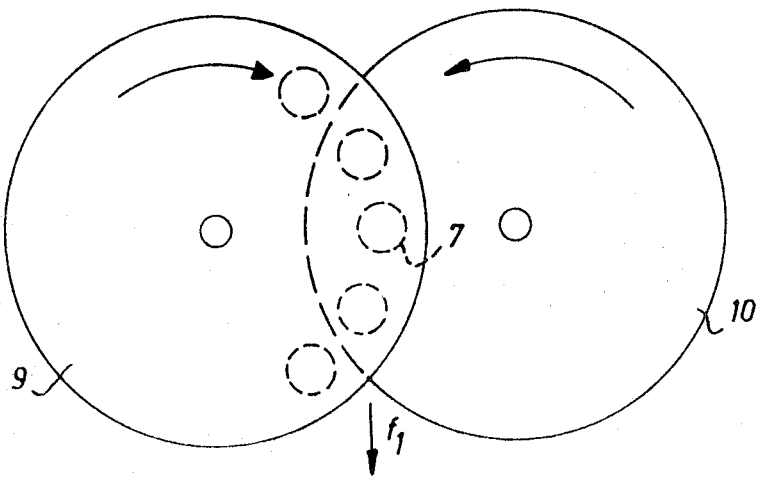
FIG. 5 is a diagram of the grinding operation of the prior art.

For the lateral grinding operation (FIG. 5), the rings mounted inside the holding rings 7 are carried by a ring-carrier 9 between two grinding wheels 10 rotating in opposite directions, which subject each section to wrenching forces in torsion. Now, the sections have no positive fixing; in order to withstand this torsional force, they only have the force which applies them in service against the cylinder, so that they are able to move under the wrenching force.

The external grinding operation is carried out on a standard cylindrical grinding machine by holding the piston rings on a central mandrel by means of small powerful springs arranged in the centre of the U. This fixing of each section, also non-positive and elastic, permits its movement under the wrenching force produced by the grains of the grinding wheel.

In consequence of this, the geometry is affected, both of the faces and the lips of the scraper ring, in the form of generally irregular deformations on the faces and of saw teeth on the lips.

Thus, these two grinding operations produce irregularities on the ground portions which adversely affect the fluid-tightness which the piston ring should have against its bearing surfaces on each face of the groove of the piston and on the cylinder, and which are the cause of a large number of rejects in course of inspection after manufacture. In addition, these grinding operations are very expensive because of the successive manipulations which they entail.

According to the invention, on the contrary, the manufacture within the imposed tolerances, for example "$h$" comprised between 3.99 and 3.96 mm., is carried out on a forged elastic piston ring according to the invention in a single operation by cold-shaping or stamping with a powerful bridge press which acts on the striking punch 11 (FIG. 10) in co-operation with the shaping punches 12, the table 13 and a central holding ring 14, so as to form a matrix inside which the metal of the piston ring flows and is strictly applied against the walls of the punch 11, the table 13 and the parts 12a and 12b of the shaping punches 12.

There is shown in FIG. 13 the piston ring 1 housed in the tool 22 of a press 30. The operation of this press, known per se, is as follows:

At each punching cycle, the press acts on the head 31 of a striker unit 25, and first compresses in the direction of the arrow $f_2$ the springs 24 which bring into position the striking punch 11 of the striker unit.

Under the striking punch 11 there are then located a central holding ring 14, the blank of the piston ring 1 and the shaping fingers 12.

However, under the effect of the movement of the head 31 of the striker unit driving the cone 29, radial push-rods 40 are driven in the direction of the arrows $f_3$, and cause the parts 41 to pivot in their swivel joints 33; the position of the swivel joints 33 is adjusted with precision by the nuts 34. The rocking movement of the part 41 acts on the finger-carrier 35 in the direction of the arrow $f_4$, and the scraper ring 1 is cold-forged to the desired size between the table 13, the striking punch 11, the shaping fingers 12, while the central ring 14 ensures the maintenance of the piston ring 1 and the dimension of its internal diameter.

In the prior art, this hammering operation was limited to a simple approximate shaping using small forces of the order of 15 to 20 tons, and the defects of shape or size which it produced were intended to be corrected by grinding the faces and the outer lips with a grinding vessel.

On the contrary, in accordance with the method of the invention:

(a) the faces of the tools, the table, the hammer and the shaping fingers, which determine the shape and the dimensions of the lateral and outer faces of the piston ring are produced with conditions of shape, surface and size which are exactly those corresponding to the finished product;

(b) the forces applied exceed the strength of the metal of the scraper ring so as to obtain a flow of the sections one against the other and against the walls of the tools;

(c) the blank of the scraper ring subjected to the hammering operation comprises, even with the minimum tolerances of the strip, a quantity of material slightly greater than that which is necessary to fill the shape of the ring to be hammered;

(d) the tool, and in particular the shaping fingers comprise clearance spaces in order to house the possible excess of material as above, and, when so required, those resulting from the dimensions of the strip which are above the minimum tolerances.

The machine provides a finished product within the final tolerances imposed on the height "$h$" of the parallel lips of the U. On the external diameter, the shape and the size are very close to those of the finished product, but they comprise slight burrs due to the flow of the metal in the interstices which exist on the one hand between the shaping fingers and on the other hand between the table and the hammer. It will subsequently only require a grinding-in of the lips to remove thse burrs.

At this stage of the shaping process, the scraper ring must be expanded and heat treated.

Figure 15:
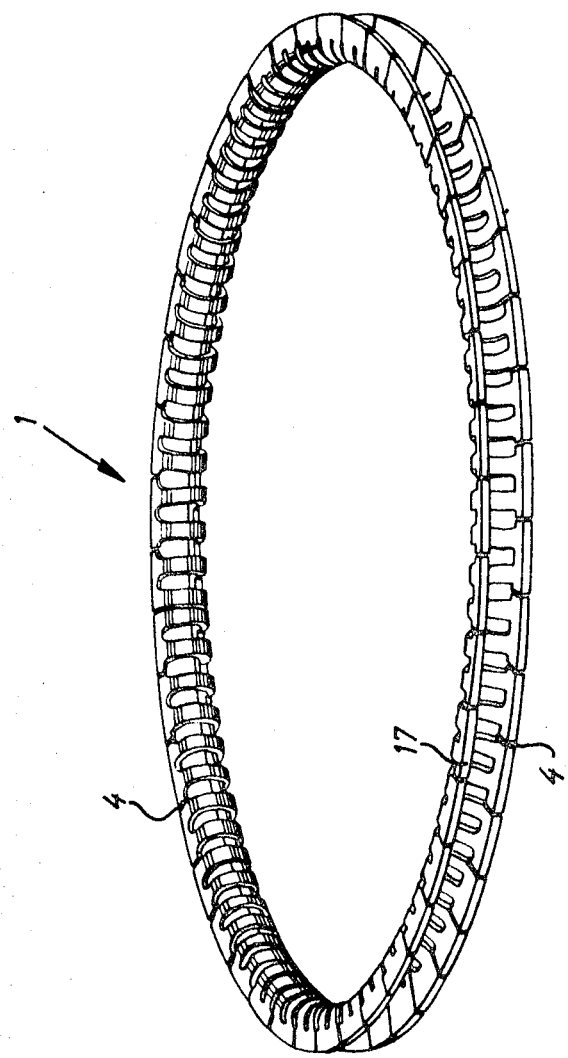
FIG. 15 is a view in perspective to a larger scale of the press of FIG. 11.

The expanding operation on the scraper ring 1 of FIG. 15 for example has the effect of causing an enlargement of each space 4 so as to put the opposite section 17 in a state of tension when the ring is subsequently compressed in the cylinder for which it is intended. It is these added tensions which will ensure that the scraper ring is applied against the cylinder.

Figure 16:
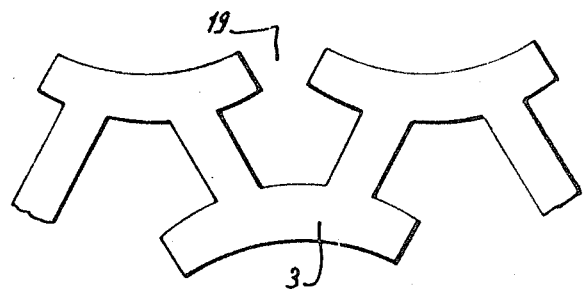
FIGS. 16 and 17 are explanatory sketches of a detail.

In the prior art, the expanding operation took place immediately after removal from the press on a metal having a strength of 60 kg. for example, which was easily and above all irregularly deformed. FIG. 16 gives an exaggerated illustration of these deformations in 19. The correct geometry of the scraper ring was partly re-established by final grinding.

Figure 17:
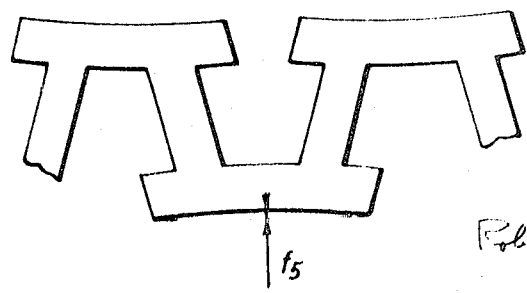

On the contrary, according to the invention, the scraper ring is subjected to the greater part of its heat treatment (normal hardening and partial tempering) immediately after the shaping operation in the press and before the expanding operation. It has in fact been found that by applying the expanding operation to a scraper ring of steel which is already highly elastic the deformation is less and the irregularities are eliminated; in particular, the sag $f_5$ (see FIG. 17) of an arcuate section is reduced to a few microns instead of several hundredths of a millimeter in scraper rings of the prior art.

On the other hand, the treated ring does not retain this expansion, but it has also been found that by applying to it the last part of the tempering of its heat treatment while maintaining it in a state of expansion, a permanent expansion is obtained without deformation.

In order to give the scraper ring the required uniformity of shape and dimensions, the invention utilizes the following means:

(a) a press, the striking forces of which are of the order of 100 to 200 tons so as to apply to the metal of the ring pressures which are higher than its compression strength, for example of the order of 100 to 120 kg./sq. mm.;

(b) a die comprising on the one hand a working space defined (see FIG. 10) by the table 13, the fingers 12, the hammer or striking punch 11 and the ring 1 itself which closes it on the side of the rounded part of the U, and on the other hand, clearance spaces, for example 23 between the chamfers 20 and the ring 1, and 27 between the rounded portion 29 and the corners 17 and 18 of the tool, and in the channels 16 provided in the shaping fingers. These channels 16 are preferably parallel to the axis of movement of the fingers in order not to interfere with their disengagement.

(c) scraper ring blanks, of which the sections intended to occupy the working space of the above mentioned die always have a volume of material:

Slightly greater than that of the said working space, even when the strip is at the minimum values of its dimensional tolerances;

Considerably less than the working space and the clearance spaces combined, even when the strip is at the maximum values of its dimensional tolerances.

Figure 6:
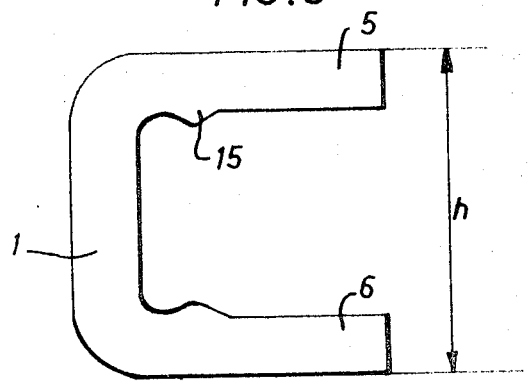
FIG. 6 is a view in cross-section to a larger scale of the scraper ring of FIG. 1 after the action of the press.
Figures 7, 8:
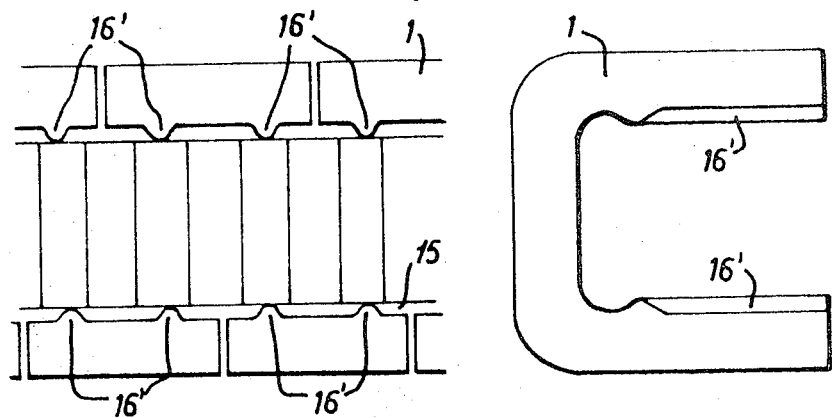
FIG. 7 is a front view of the lips of the ring of FIG. 1 according to an alternative form.
FIG. 8 is a view in cross-section of the ring shown in FIG. 7.
Figure 9:
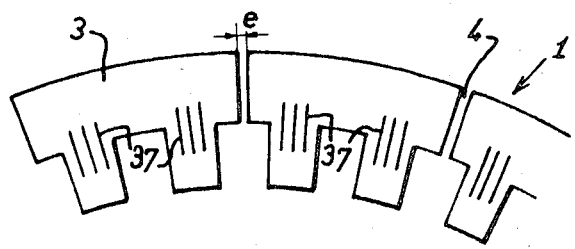
FIG. 9 is a surface view to a large scale of a portion of the ring of FIG. 1.

Thus, by virtue of the flow of the metal and of the shape of the blank, close to that of the finished product, the excess material first completely fills the working space of the die, which ensures the strict shape and dimensions of the ring, and can then always be accommodated in a clearance space. In other words, the functional dimensions and shape of the forged scraper ring are independent of the dimensional variations of the raw material, within the limits of its tolerances, and the variations of the said tolerances only cause variations in the circular beads 15 (see FIG. 6), the beads 16′ parallel to the axes of movement of the fingers (FIGS. 7 and 8), and of the deformation towards the right angles 17 and 18 external to each rounded portion 39 (FIG. 10).

When the scraper ring leaves the shaping tool, it is possible that stresses may slightly modify in one direction or in the other, depending on the quantity of excess material which has been upset, the parallelism of the arms of the U. Now, in order to remain within the tolerances specified, which are about 0° for the convergence of the arms of the U and 2° for their divergence, a good result has been obtained by utilizing for the table 13′, the hammer 11′ and the fingers 12′, an opening angle of 50 minutes of arc, as shown in FIG. 14.

After the second phase of heat treatment, it is only necessary to apply a simple grinding or honing of the outer lips of the scraper ring in order to remove the flow burrs and to give them the circular shape corresponding to the cylinder which the forging action on the shaping fingers has given them, and the scraper ring only requires a surface treatment, if so desired, for its completion.

Figure 10:
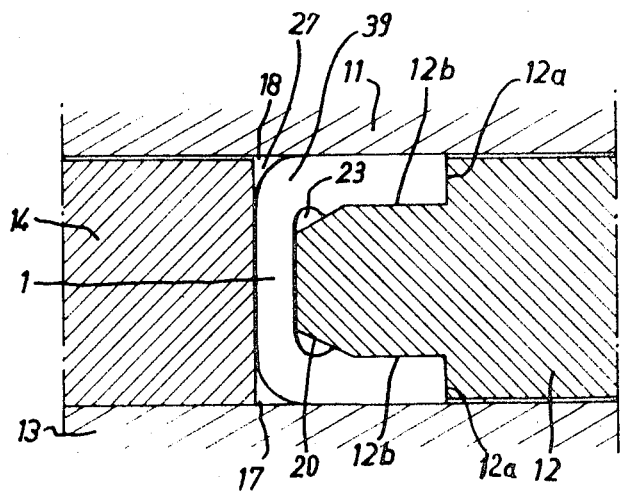
FIG. 10 is a sketch of the cold-pressing operation.
Figure 12:
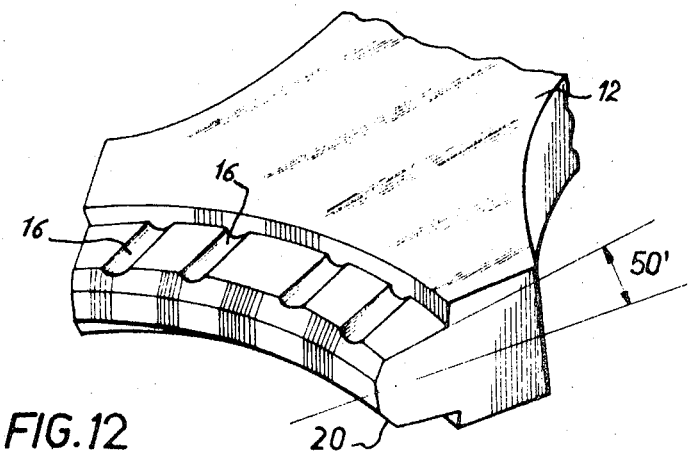
FIG. 12 is a perspective view of a shaping finger of the press of FIG. 11.
Figure 11:
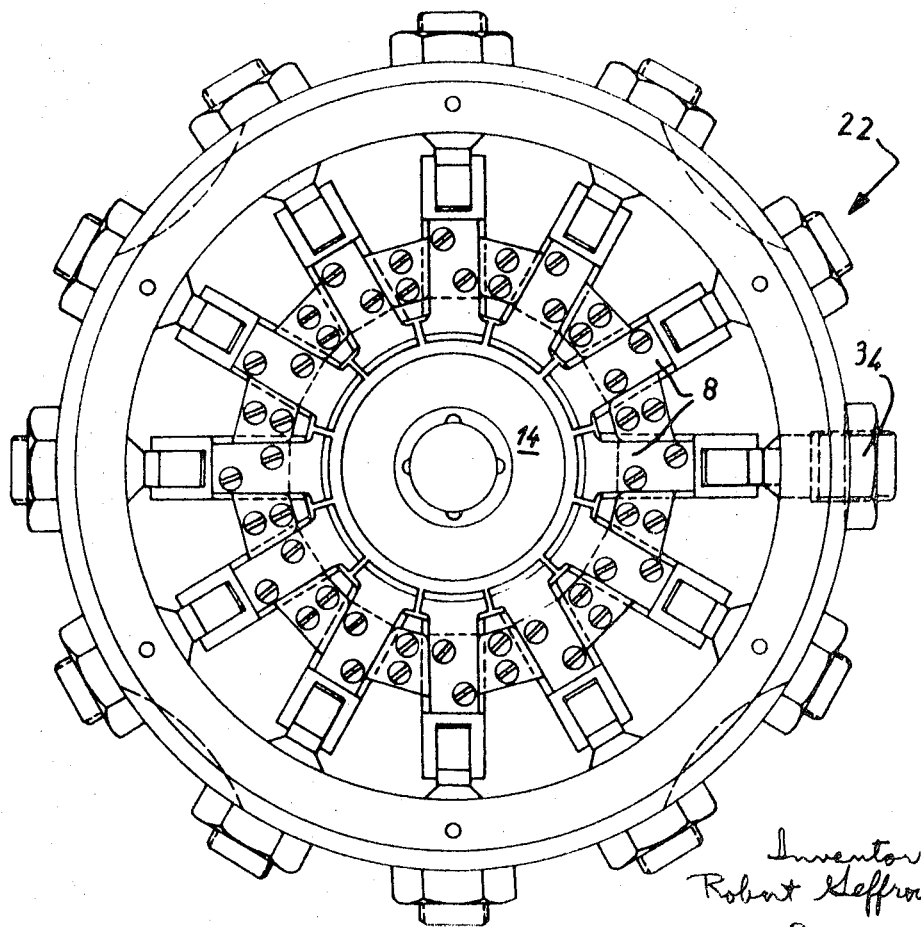
FIG. 11 is a plan view from above of a press tool for manufacturing the scraper ring of FIG. 1.
Figure 14:
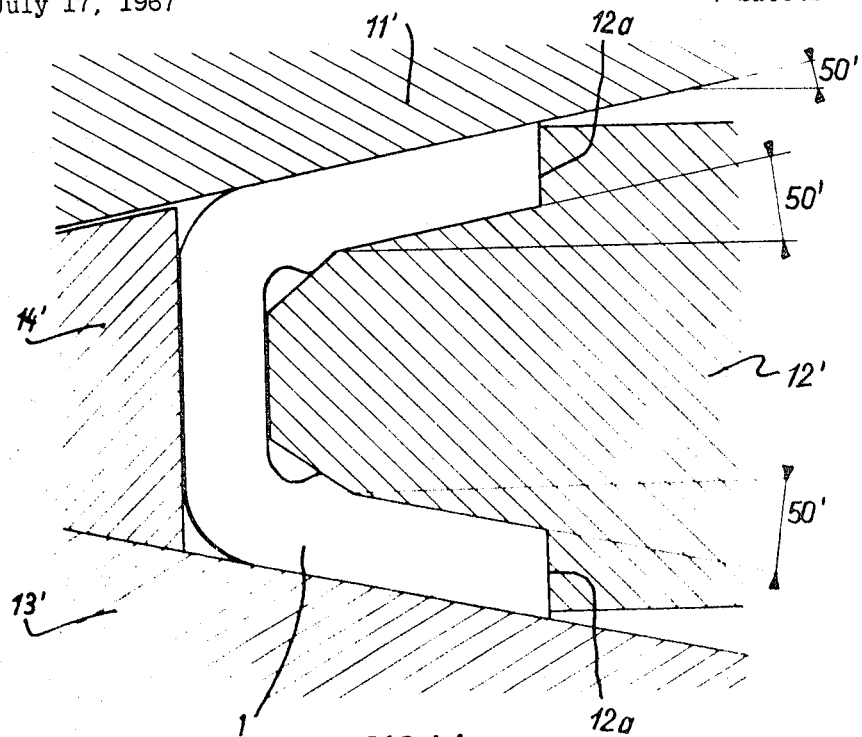
FIG. 14 is an exaggerated view in cross-section of an alternative form of the arrangement shown in FIG. 10.

Finally, the shape of the counterpart of the lips carried by the shaping fingers at 12a, FIGS. 10 and 14, makes it possible to modify the shape of the lips themselves and to give them at will a cylindrical form adhering to the cylinder, or domed or conical with the bearing surface towards the centre or towards the exterior.

It can be seen that the method according to the invention comprises the following steps, starting with cold-rolled spring steel strips supplied with tolerances on the thickness of the order of ±0.025 mm.: perforation, cutting-out forming the U blank, bending, forging in the press with cold, upsetting within the dimensional tolerances on the double thickness of about ±0.015 mm., treating by hardening and a first tempering, expanding by force and carrying out a second temper with the ring remaining under expansion, grinding the outer lips and applying a surface treatment if so required.

The scraper ring is then shaped within the strict tolerances imposed, which results in the upset of metal 15 towards the internal coupling fillet of the wings and the bottom of the U, or alternatively by beads on the internal branches of the U at 16′ or again in an alternative form by an upsetting of the fillets of the ring towards the acute angles 17 and 18.

The ring thus obtained consequently retains its initial outer surface produced by rolling and forging, and even after forging the outer faces, the small striations 37 caused by the U bending tool are frequently visible on the lateral surfaces of the sections of the ring 1 according to the invention.

Similarly, the external lips do not require grinding since they leave the matrix with a satisfactory geometrical shape. They will only be given a slight honing so as to remove the small burrs of metal which may have flowed into the interstices formed between the various elements of the matrix.

This honing operation is shown by microscopic traces of scratches parallel to the axis of the scraper ring.

On the contrary, on the scraper rings of prior art, the lateral surfaces of the sections showed ordinary grinding grooves in dispersed orientations, and the lips showed grinding striations parallel to the faces.

It can therefore be seen that in a scraper ring according to the invention:

The total clearance between the sections 4 can be reduced to any size down to zero if so desired, when the ring is in its working position in the cylinder;

The section of the ring has upset beads in proportion to the excess of material resulting from the forging operation;

The lateral faces of the ring remain in the condition left by rolling followed by forging, and do not show any trace of removal of metal; at the most, it is possible to see the uniform traces of the U-forming tool which may sometimes remain after forging;

The dimensional tolerances of the finished scraper ring are exactly governed by the dimensions of the pressing matrix, with the sole exception of the subsequent grinding-in of the lips;

The fluid-tightness in service is as high as may be desired, since this ring has flat lateral faces free from deformation, and external lips ground in a position identical with those of the ring in the cylinder. It may thus even be suitable for engines working under low loads with a high mean depression;

The ring may have lips of specially thin form, or with conical or domed bearing surfaces, by arrangement of the shape of the forming fingers, without requiring any additional operations.

It will of course be understood that the present description has been given above by way of explanation only and not in any limitative sense and that any modification of detail may be made thereto in accordance with its spirit, without thereby departing from its scope.

What is claimed is:

1. The method of producing a circumferentially-compressible piston ring comprising the steps of:
   (a) forming a generally planar blank of thin spring steel having spaced, lip-forming margins connected by a transverse web, the web including closely spaced slots defined by intermediate web portions, and alternate slots communicating at the end adjacent the lip-forming portion through a clearance to the free edge of the lip-forming portions; and
   (b) cold-forming the blank into an outwardly-opening U-shaped cross-section including overlying lips and a connecting web in which the outer surfaces of the piston ring and dimensional tolerances are within those of the finished piston ring by plastically forcing the excess material of the ring into inner surfaces of the ring lips.

2. The method as claimed in claim 1 including the step of honing away excess burrs with minimum disturbance of the external finished dimensions and surface quality of the ring.

3. The method as claimed in claim 1 including forming the excess blank material as circumferential ribs adjacent the juncture of the inner surfaces of the web and lips.

4. The method as claimed in claim 3 including forming the excess blank material into a plurality of ribs on the inner surface of said lips extending radially from said circumferential ribs.

5. The method as claimed in claim 3 including forming the excess material as a plurality of radial ribs on the inner surfaces of said lips.

6. The method as claimed in claim 1 including maintaining the maximum folded thickness of said blank less than the maximum permissible spacing of said lips.

7. The method as claimed in claim 1 including the step of heat treating the cold-formed ring to harden and partially temper the ring, expanding the ring while partially tempered and elastic and maintaining the ring expanded within external tolerances and allowable dimensional limits.

8. The method as claimed as claimed in claim 7 including the step of heat treating the ring a second time while it is expanded, and attaining finished dimensions, finished hardness and finished temper.

9. The method as claimed in claim 1 including cold-forming the blank by initially applying radial circumferential and inward force into the blank and forming a U-shaped cross-section while maintaining substantially finished outer dimensions of the ring, and immediately thereafter folding said blank into a finished U-shaped cross-section through force imposed at the opposite free margins of the blank.

References Cited

UNITED STATES PATENTS

| | | | |
|---|---|---|---|
| 2,311,728 | 2/1943 | Bowers | 29—156.6 |
| 2,311,729 | 2/1943 | Bowers | 29—156.6 |
| 2,346,898 | 4/1944 | Bowers | 29—156.6 |
| 2,694,659 | 11/1954 | Norton | 29—156.6 |
| 2,697,865 | 12/1954 | Norton | 29—156.6 |
| 2,668,131 | 2/1954 | Hamm | 148—12.4 |

L. DEWAYNE, RUTLEDGE, Primary Examiner

W. W. STALLARD, Assistant Examiner

U.S. Cl. X.R.

29—156.6; 148—12.4